United States Patent
Book

(10) Patent No.: US 8,081,992 B2
(45) Date of Patent: Dec. 20, 2011

(54) SYSTEM AND METHOD FOR DISPLAYING THE GEOGRAPHIC LOCATION ASSOCIATED WITH A PHONE CALL RECEIVED ON A PHONE-EQUIPPED MOBILE DEVICE

(75) Inventor: Christopher Book, Waterloo (CA)

(73) Assignee: Research In Motion Limited, Waterloo (CA)

( * ) Notice: Subject to any disclaimer, the term of this patent is extended or adjusted under 35 U.S.C. 154(b) by 984 days.

(21) Appl. No.: 12/024,230

(22) Filed: Feb. 1, 2008

(65) Prior Publication Data

US 2009/0197621 A1    Aug. 6, 2009

(51) Int. Cl.
*H04W 24/00*    (2009.01)

(52) U.S. Cl. ............. 455/457; 455/414.1; 455/415; 455/418; 455/456.1; 455/550.1; 455/566; 455/567; 370/310.2; 370/328; 379/142.01; 379/142.1; 379/201.01; 379/201.06; 379/201.07; 379/201.08

(58) Field of Classification Search ........... 455/414.1, 455/415, 418, 456–457, 550.1, 566–567; 370/310.2, 328; 379/142.01, 142.1, 201.01, 379/201.06, 201.07, 201.08
See application file for complete search history.

(56) References Cited

U.S. PATENT DOCUMENTS

| | | | |
|---|---|---|---|
| 6,697,630 B1 * | 2/2004 | Corwith | 455/457 |
| 6,721,406 B1 * | 4/2004 | Contractor | 379/142.06 |
| 7,031,728 B2 * | 4/2006 | Beyer, Jr. | 455/456.3 |
| 7,353,034 B2 * | 4/2008 | Haney | 455/457 |
| 7,796,998 B1 * | 9/2010 | Zellner et al. | 455/456.1 |
| 2002/0123368 A1 | 9/2002 | Yamadera et al. | |
| 2006/0034441 A1 | 2/2006 | Kraft | |
| 2006/0166684 A1 * | 7/2006 | Karaoguz et al. | 455/457 |
| 2006/0205432 A1 | 9/2006 | Hawkins et al. | |
| 2007/0142078 A1 | 6/2007 | Chen et al. | |

FOREIGN PATENT DOCUMENTS

| | | |
|---|---|---|
| EP | 1628460 A | 2/2006 |
| EP | 1768360 A | 3/2007 |
| WO | 9848555 A | 10/1998 |

OTHER PUBLICATIONS

Extended European Search Report issued Jul. 4, 2008 in respect of EP Patent Application No. 08150952.3.

* cited by examiner

*Primary Examiner* — Steve D Agosta
(74) *Attorney, Agent, or Firm* — Ridout & Maybee LLP

(57) ABSTRACT

Embodiments of a system and method for displaying a geographic location associated with an incoming call being received on a mobile device are provided. The mobile device has a user interface that provides a call screen to the user for identifying a phone number associated with the incoming call, and for displaying data including the geographic location associated with the incoming call. The geographic location is resolved by identifying a geographic location associated with a contact entry in the address book of the mobile device, or by comparing the area code of the phone number of the incoming call in a list of area codes and associated geographic location to find a match corresponding to the area code of the incoming call.

20 Claims, 8 Drawing Sheets

SYSTEM AND METHOD FOR DISPLAYING THE GEOGRAPHIC LOCATION ASSOCIATED WITH A PHONE CALL RECEIVED ON A PHONE-EQUIPPED MOBILE DEVICE

TECHNICAL FIELD

Embodiments described herein relate generally to mobile device applications, and more specifically to phone-equipped mobile devices that allow calls to be received by users.

BACKGROUND

With the proliferation of mobile telephony, wireless communication networks are becoming increasingly available across the world. Mobile device users can now enjoy placing outgoing phone calls and receiving incoming phone calls in various countries given the availability of wireless network coverage.

Typically, mobile devices are configured to notify users of an incoming call by displaying an incoming call screen in which details of the call are presented to the mobile user. For example, text data comprising a name and telephone number associated with the originating call may be displayed in an upper half of the incoming call screen. A list of virtual buttons representing user-selectable options to answer the call or ignore the call may be displayed in a lower half of the incoming call screen.

While the particulars of the incoming call displayed in the incoming call screen may provide a user with some information about the party originating the call, it is often difficult for the user to determine the geographical location of the calling party so as to ascertain whether to respond or ignore the incoming call.

BRIEF DESCRIPTION OF THE DRAWINGS

For a better understanding of example embodiments described herein, and to show more clearly how they may be carried into effect, reference will now be made, by way of example, to the accompanying drawings in which.

DETAILED DESCRIPTION

Figure 1:
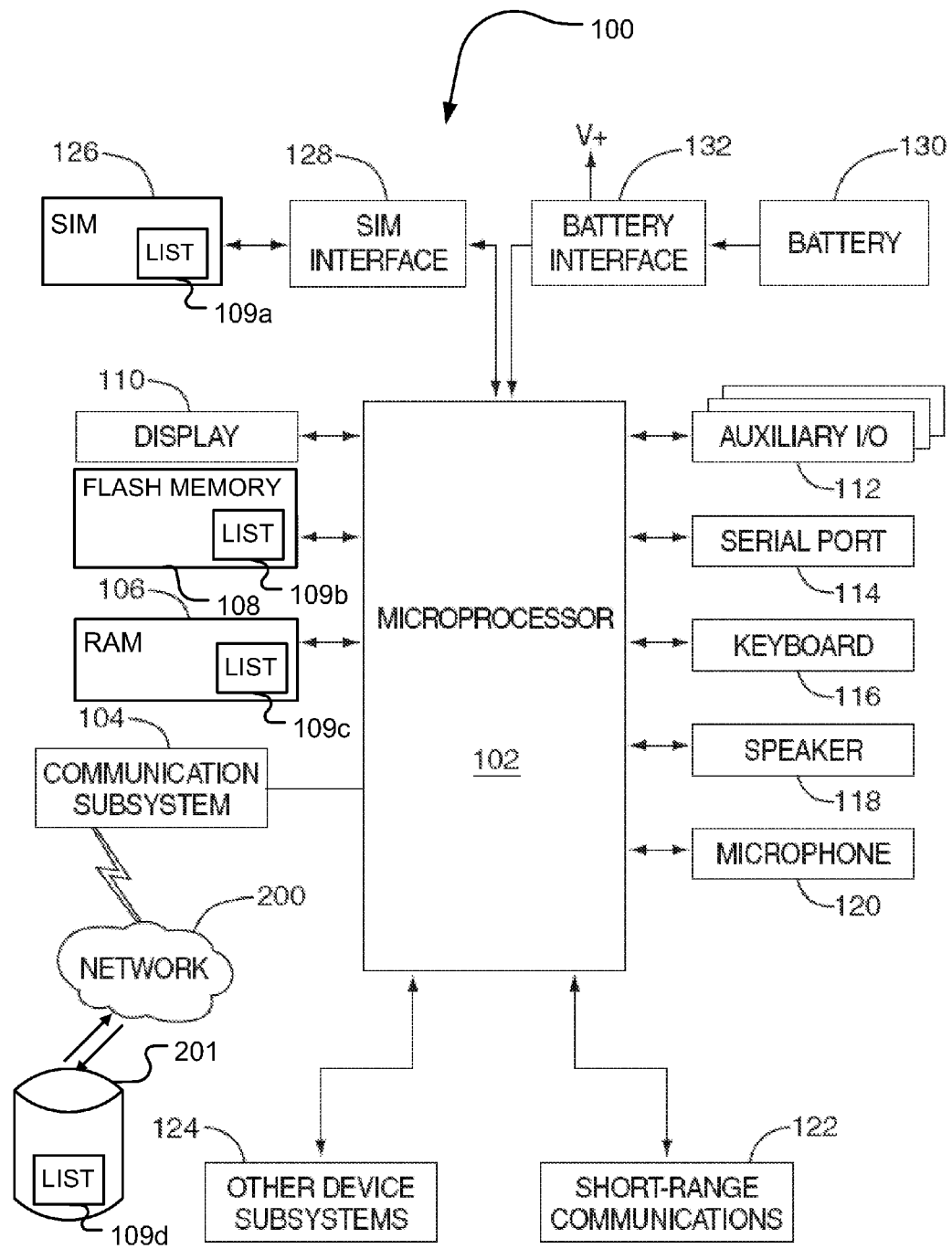
FIG. 1 is a block diagram of a phone-equipped mobile device in one example implementation.

As mobile devices become more functional, the number of user-selectable options that can be made available to users for managing incoming calls will increase. Providing the user with all available options for responding to a call at the time the call is first received can be difficult to accommodate, particularly in known user interfaces where incoming call details do not include the geographic location attributes associated with the call.

Example embodiments described herein are generally directed to a system and method for displaying the geographic location associated with a phone call received on phone-equipped mobile devices.

In a broad aspect, there is provided a method for displaying a geographic location associated with an incoming call being received on a mobile device, the mobile device providing access to at least a first communication line configured to receive the calls, the method comprising the steps of: identifying a phone number associated with the incoming call; determining the geographic location associated with the incoming call; and displaying an incoming call screen on a display of the mobile device, the incoming call screen comprising a caller identification data field for displaying data including the geographic location associated with the incoming call.

In one embodiment, there is provided a method for displaying a geographic location associated with an incoming call being received on a mobile device, the mobile device providing access to at least a first communication line configured to receive the calls, the method comprising the steps of: identifying a phone number associated with the incoming call; determining the geographic location associated with the incoming call; and displaying an incoming call screen on a display of the mobile device, the incoming call screen comprising a caller identification data field for displaying data including the geographic location associated with the incoming call; wherein the step of determining the geographic location includes the steps of: determining whether a contact entry is associated with the incoming call; and determining the geographic location associated with the contact entry.

In another embodiment, there is provided a method for displaying a geographic location associated with an incoming call being received on a mobile device, the mobile device providing access to at least a first communication line configured to receive the calls, the method comprising the steps of: identifying a phone number associated with the incoming call; determining the geographic location associated with the incoming call; and displaying an incoming call screen on a display of the mobile device, the incoming call screen comprising a caller identification data field for displaying data including the geographic location associated with the incoming call; wherein the step of determining the geographic location includes the steps of: comparing the area code of the incoming call with entries in a list including geographic area codes and associated geographic locations; and mapping the area code of the incoming call to corresponding geographic location in the list.

In yet another embodiment, there is provided a method of providing a user interface for managing incoming calls received at a mobile device, the mobile device providing access to at least a first communication line configured to receive incoming calls, the mobile device providing send and end keys, the method comprising the steps of: identifying a phone number associated with the incoming call; determining the geographic location associated with the incoming call; and displaying an incoming call screen on a display of the mobile device, the incoming call screen comprising (i) a caller identification data field displaying data including the geographic location associated with the incoming call and (ii)

at least one key label field in which first and second labels for the send key and end key respectively are displayed.

These and other aspects and features of various example embodiments will be described in greater detail below.

Some embodiments described herein make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device. A mobile device communicates with other devices through a network of transceiver stations.

Figure 2:
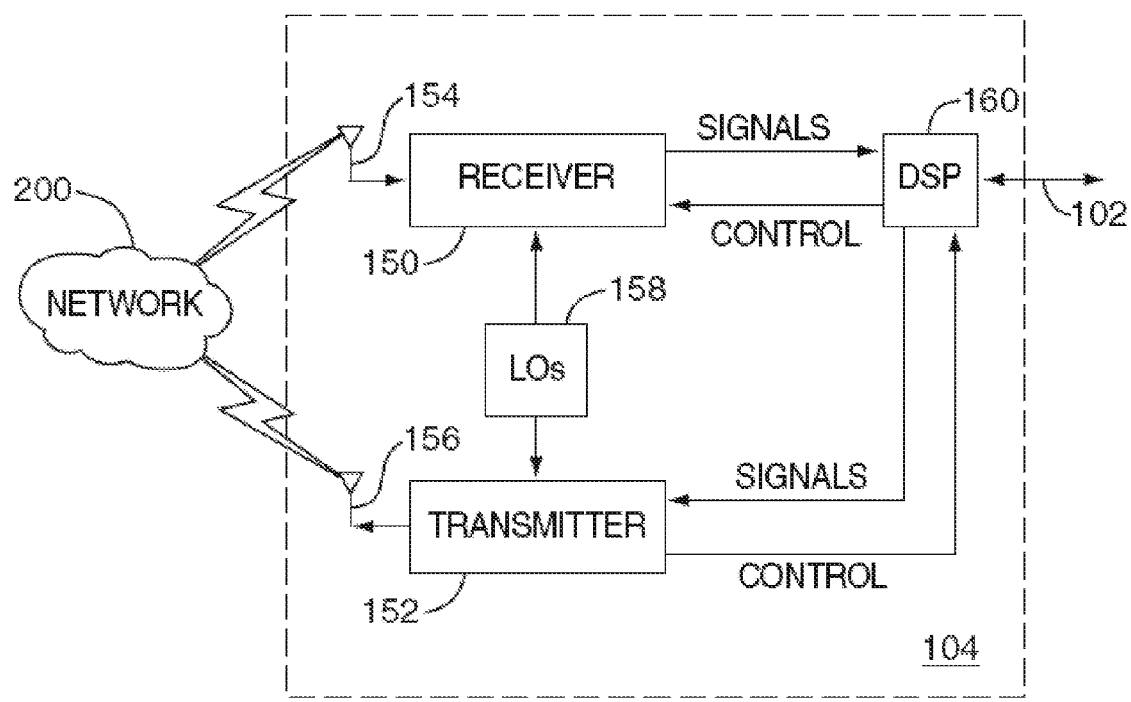
FIG. 2 is a block diagram of a communication subsystem component of the mobile device of FIG. 1.
Figure 3:
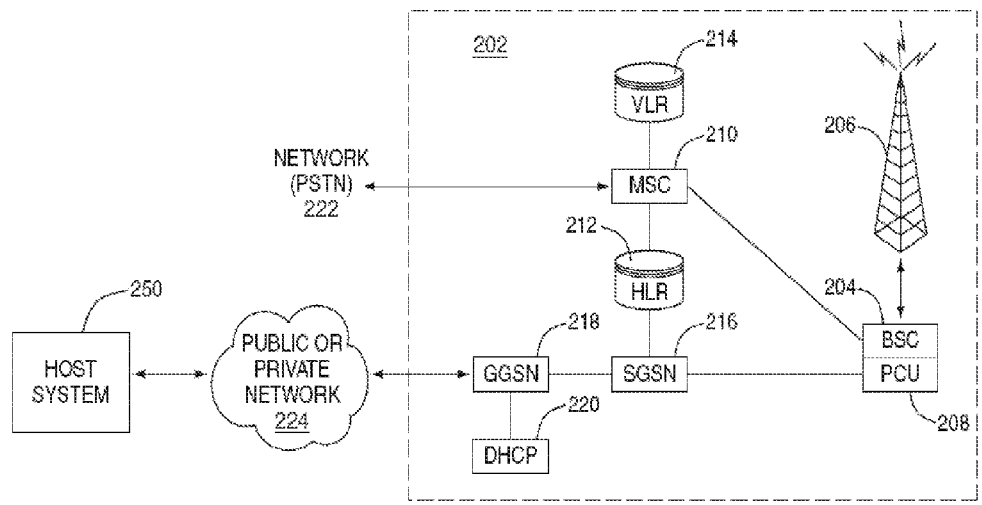
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. The network 200 is in communication with a database 201. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the disclosure is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information, recent call information, or other information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSNs 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be de-allocated and the IP address returned to the IP address pool managed by DHCP server 220.

Figure 4:
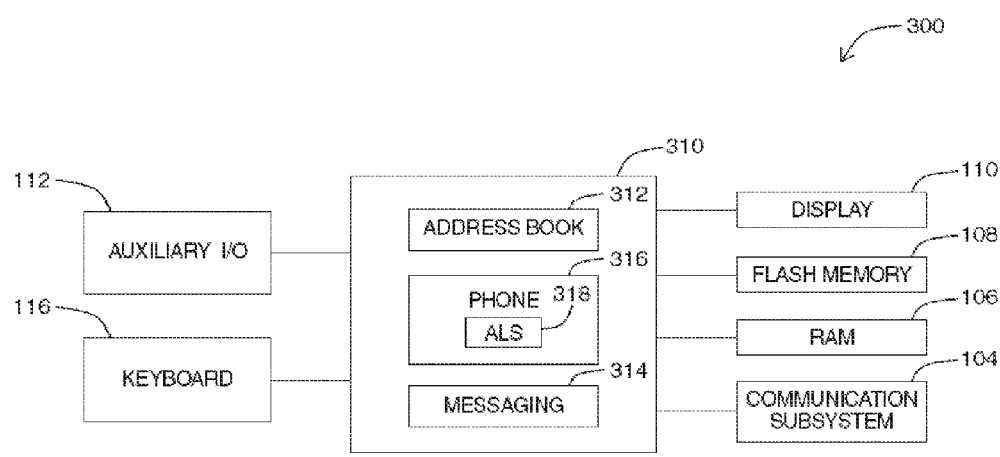
FIG. 4 is a block diagram illustrating further aspects of the mobile device of FIG. 1.

Referring now to FIG. 4, a block diagram illustrating further aspects of mobile device 100 of FIG. 1 is shown generally as 300. As noted earlier with reference to FIG. 1, microprocessor 102, in addition to its operating system functions, enables execution of software applications on mobile device 100. A set of applications that control basic device operations, including data and voice communication applications, will normally be installed on mobile device 100 during its manufacture. Operating system software and other software applications are typically stored in a persistent store (e.g. flash memory 106) or other store, on mobile device 100 or on a device coupled thereto. It will be understood that the operating system, software applications or parts thereof, may be temporarily loaded in a volatile store such as RAM 106. Other instructions and/or data received by the mobile device 100 and subject to processing may also be temporarily stored in RAM 106.

Software applications that are loaded or stored on mobile device 100 may be implemented as functional components or modules 310. Modules 310 interact with various components of mobile device 100. For instance, as shown by way of example in FIG. 4, modules 310 may interact with communication subsystem 104, RAM 106, flash memory 108, display 110, auxiliary I/O device(s) 112, and keyboard 116. Modules 310 may comprise, for example, an address book module 312, a messaging module 314 (e.g. for e-mail and/or SMS or MMS messaging), and a phone application module 316.

Address book (also referred to as "contact book") module 312 is generally configured to allow contact information (e.g. contact entries comprising individual contact and company names, telephone numbers, geographical location, messaging addresses, pictures and other information) to be stored and managed.

Messaging module 314 facilitates the sending and receiving of electronic messages over a wireless network 200 and/or other network.

Phone application module 316 is generally configured to facilitate voice communication between the user and other parties, including the placement of outgoing calls by the user and the reception of incoming calls on the mobile device 100.

Calls may be placed and received on a communication line specifically configured for voice communications. In certain embodiments, calls may alternatively or additionally be placed and received on other types of communication lines, including a communication line generally configured for data communications, or a communication line configured for both voice and data communications, for example. For example, mobile device 100 may be configured to provide Voice over IP (VoIP) and/or video phone functionality.

Some mobile devices are configured to provide access to multiple (i.e. two or more) communication lines on which incoming calls may be received. Typically, these mobile devices will also be configured to allow outgoing calls to be initiated by the user over the same communication lines. Each of the multiple communication lines may have a different telephone number associated therewith. For example, a user may have a business phone number and a different personal phone number. Referring again to FIG. 4, a line selection module (e.g. alternate line service (ALS) module) 318 is provided to facilitate selection of the communication line to be used by phone application module 316 for receiving an incoming call, for example. The line selection module 318 is configured to select a communication line to be used by phone application module 316, based upon line selection data stored on mobile device 100 (e.g. configuration settings that define a default communication line), and/or based upon input received by the user. It will be understood that the functionality of line selection module 318 may be provided or otherwise integrated with phone application module 316 or with a different module on mobile device 100.

When an incoming call is received at a mobile device, an incoming call screen is typically displayed, in which details of the call and a set of options for response are provided. As users will likely want to consider details of the incoming call first in order to determine the user's course of action (e.g. whether to answer the call or not), it may be desirable to provide more detailed information such as the geographical location associated with the incoming call on the incoming call to a user at the time the call is first received. For instance, the user may decide not to answer unrecognized geographic area codes to avoid incurring charges.

The telephone number of the incoming call is generally of a format "AAA BBB CCC DDD DDDD" which comprises: (a) an access code; (b) a country code; (c) an area code; and (d) a local number. The access code includes up to three digits and is generally displayed for international and non-local domestic calls. Under the North American Numbering Plan (NANP) which defines the phone number allocation for a number of countries including Canada and the US, the most common access code for international calls is "011", and the access code for non-local domestic calls is "1". The country code is unique to a numbering plan and may be shown calls originating from other numbering plans or countries. For example, the country code associated with Canada and the US under NANP is "1". The country code associated with Japan is "81".

The area code corresponds to the regional geographic location associated with the outgoing call. It could be of a fixed length (e.g. 3 digits in Canada and the US) or variable length (e.g. between 1 and 5 digits in Japan). For instance, the area codes "412" and "878" cover most of Allegheny County, including Pittsburgh, in Pennsylvania, US. Similarly, the country code "31" and area code "20" correspond to the city of Amsterdam in Provincie Noord-Holland, The Netherlands. While callers from within a given an area code usually do not need to include the area or country code in the number dialed, the area code is often displayed in the caller identification information and is visually quoted to the called party.

Lastly, the local number is unique to each calling party and typically includes 7 digits. The first few digits in the local number may correspond to smaller geographical areas or individual telephone exchanges. In a wireless communication network, these digits may indicate a particular network provider.

When an incoming telephone number is displayed on the mobile device, the user often looks at the area code and will try to figure out where the call is from based on the area code. The user may or may not wish to answer the phone depending on where the call is from. The user may also wish to know where the call is being placed from without having to ask the calling party.

A problem associated with the current mobile devices is that although the telephone number including the area code of the originating party may be presented to the called party once the call has been initiated, it is difficult for the called party to determine the regional geographic location associated with the calling party based on the area code digits. While some mobile device users may recall the area code associated with their surrounding areas or the areas they frequently communicate with, it can be difficult for other users to recall the plurality of area codes that are often associated with various metropolitan areas. This problem is further exacerbated for mobile device users who receive calls from different parts of the world, particularly when the area codes may be unknown to the user or may have been changed or overlayed by new area codes.

Moreover, the user is unable to decide whether to answer or ignore an incoming call originating from an unrecognized or unauthorized geographic location. For example, a mobile device user from Germany visiting Canada may wish not to answer certain calls while in Canada to avoid incurring charges.

Another drawback with existing mobile devices is that the call log providing a list of outgoing or received calls does not indicate the geographic location associated with the received calls.

In a broad aspect, there is provided a method for displaying a geographic location associated with an incoming call being received on a mobile device, the mobile device providing access to at least a first communication line configured to receive the calls, the method comprising the steps of: identifying a phone number associated with the incoming call; determining the geographic location associated with the incoming call; and displaying an incoming call screen on a display of the mobile device, the incoming call screen comprising a caller identification data field for displaying data including the geographic location associated with the incoming call.

In one embodiment, there is provided a method for displaying a geographic location associated with an incoming call being received on a mobile device, the mobile device providing access to at least a first communication line configured to receive the calls, the method comprising the steps of: identifying a phone number associated with the incoming call; determining the geographic location associated with the incoming call; and displaying an incoming call screen on a display of the mobile device, the incoming call screen comprising a caller identification data field for displaying data including the geographic location associated with the incoming call; wherein the step of determining the geographic location includes the steps of: determining whether a contact entry is associated with the incoming call; and determining the geographic location associated with the contact entry.

In another embodiment, there is provided a method for displaying a geographic location associated with an incoming call being received on a mobile device, the mobile device providing access to at least a first communication line configured to receive the calls, the method comprising the steps of: identifying a phone number associated with the incoming call; determining the geographic location associated with the incoming call; and displaying an incoming call screen on a display of the mobile device, the incoming call screen comprising a caller identification data field for displaying data including the geographic location associated with the incoming call; wherein the step of determining the geographic location includes the steps of: comparing the area code of the incoming call with entries in a list including geographic area codes and associated geographic locations; and mapping the area code of the incoming call to the corresponding geographic location in the list.

In yet another embodiment, there is provided a method of providing a user interface for managing incoming calls received at a mobile device, the mobile device providing access to at least a first communication line configured to receive incoming calls, the mobile device providing send and end keys, the method comprising the steps of: identifying a phone number associated with the incoming call; determining the geographic location associated with the incoming call; and displaying an incoming call screen on a display of the mobile device, the incoming call screen comprising (i) a caller identification data field displaying data including the geographic location associated with the incoming call and (ii) at least one key label field in which first and second labels for the send key and end key respectively are displayed.

Further features of the above-mentioned embodiments and of other embodiments will be apparent from the description that follows and the appended Figures.

Figure 5:
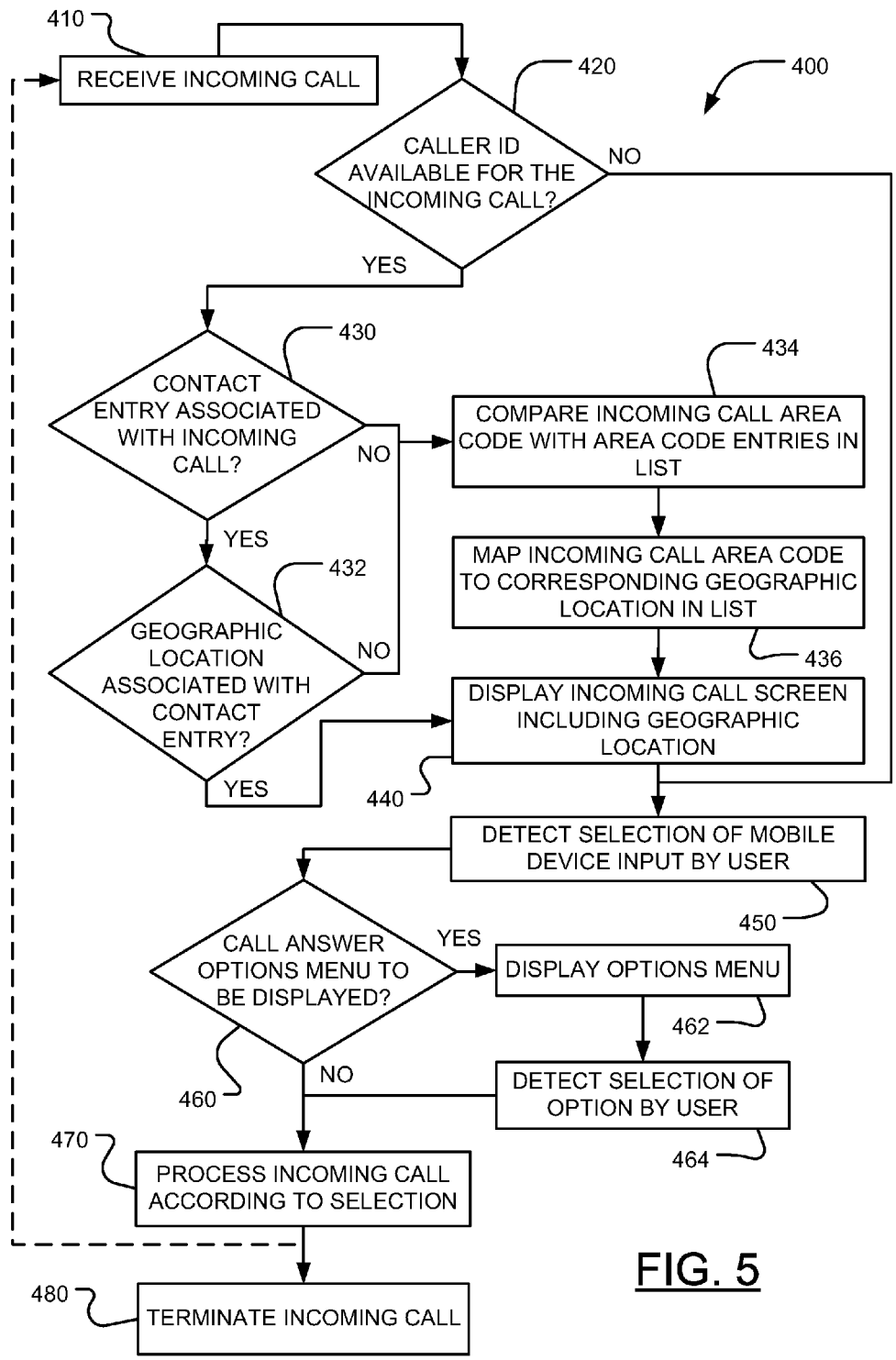
FIG. 5 is a flowchart illustrating steps of a method of providing a user interface for method for displaying the geographic location associated with a phone call received on the mobile device.

Referring now to FIG. 5, a flowchart illustrating steps of a method of providing for displaying the geographic location associated with a phone call received on a phone-equipped mobile and a user interface therefor in accordance with at least one example embodiment is shown generally as 400. Additional details of some of the features described below in respect of the steps of method 400 may be described earlier in the present specification.

In one embodiment, the steps of method 400 are performed at the mobile device by an application (e.g. phone application module 316 of FIG. 4) that executes and resides on the mobile device (e.g. mobile device 100 of FIG. 1). The application need not be a stand-alone application, and the functionality described herein may be implemented in one or more applications executing and residing on the mobile device.

At step 410, a call for a user of the mobile device ("incoming call") is received on a communication line accessible at the mobile device. The call may be received over a communication line specifically configured for voice communications, for data communications, or for both, depending on the implementation.

At step 420, a determination is made as to whether the caller identification attributes (hereinafter referred to as the "Caller ID") associated with the incoming call is available. The Caller ID information includes the phone number associated with the incoming call for the purposes of identification of the calling party. Where available, Caller ID can also provide the name of the calling party. The Caller ID may subsequently be displayed to the user. It may also be used, for example, to determine the identity of the caller and to associate the incoming call with a contact entry in the user's address book (e.g. address book 312 of FIG. 4). If no Caller ID information is available for the incoming call, the flow of method steps then proceeds directly to step 450.

If Caller ID information is available for the incoming call, then at step 430, the application seeks to determine whether a contact entry in the user's address book is associated with the incoming call. This may be performed by attempting to match the phone number identified at step 420 with a corresponding data item in a contact entry in the user's address book (e.g. the address book entry of FIG. 6). If a match is found, then at step 432, the geographic location relating to the contact entry (and advantageously other information such as the individual name, company name, picture, etc.) may be retrieved for subsequent display at step 440 in a caller identification data field of an incoming call screen. However, if there is no contact entry associated with the incoming call, or, if no geographical location is linked with the contact entry for the incoming call, then at step 434 the phone number of the incoming call is compared with entries in a list containing area codes and corresponding match is found, then at step 436, the incoming call phone number is mapped to the corresponding geographic location in the list entry.

At step 440, an incoming call screen is displayed to the user on a display (e.g. display 110 of FIG. 1) of the mobile device. The incoming call screen informs the user that a call is being received at the mobile device, and presents the user with options for response. The incoming call screen is divided into a caller identification data field for displaying data including the geographic location associated with the incoming call, and at least one key label field in which labels can be displayed to inform the user of at least some actions that may be taken by the user by depressing certain keys provided on the mobile device. Further user interface features in respect of the incoming call screen that may be implemented in various embodiments are illustrated with reference to the example screenshots of FIGS. 7 through 9.

In use, when a call is first received at the mobile device, the user will typically look at the displayed incoming call screen to see who is calling and from what geographic location. Accordingly, it may be preferable to have a substantial portion of the incoming call screen dedicated to providing the information that identifies the caller when the call is first received. The user will then need to decide what action should be taken with respect to the incoming call. It is expected that the user will often decide to simply answer or ignore the call by depressing the send or the end key without the need to consider alternative response options. For instance, if the user does not wish to respond to any calls from a particular geographic location, the user may simply ignore to answer the incoming call.

At step 450, a selection of a mobile device input made by the user (e.g. the user has depressed the key) is detected. The selected input may be a send key (e.g. an "Answer" key), an end key (e.g. an "Ignore" key), a menu key, or some other pre-programmed key.

At step 460, it is determined whether the selection made at step 450 is to result in the display of an options menu. For example, if a menu key is pressed, an options menu will be displayed to the user.

In an example use, the user directs that an option menu be displayed when the user wishes to consider additional options for responding to the incoming call (e.g. "advanced options") other than the basic answer and ignore functions available by pressing the send or end keys. As a result, the information identifying the caller (e.g. caller's Caller ID information and geographic location) as displayed in the caller identification data field need not be obscured unless the user specifically wishes to consider the additional options.

The menu key may or may not be identified by an options menu identifier displayed in association with that menu key. Where the menu key is to be identified by an options menu identifier, the options menu identifier is displayed in a key label field in this embodiment.

On the other hand, if the send key or the end key is pressed, another action (e.g. answering the call, ignoring the call) will be performed without requiring the options menu to be displayed. Furthermore, where the user is already engaged in a different call when the incoming call is received, a default answering function (e.g. answer the incoming call and hold the other call) will be performed when the send key is pressed.

An options menu provides the user with options for responding to the call currently being received at the mobile device. For example, where the user is already engaged in a different call when the incoming call is received, the user may be provided with the following options: answer the incoming call and hold the other call, answer the incoming call and drop the other call, or ignore the incoming call and continue with the other call.

Other options and/or different options may be provided in variant embodiments. For example, an option may be provided to place the incoming call on hold, until the user makes a further selection to answer or drop the call. As a further example, an option may be provided to forward the incoming call to another telephone number (e.g. a landline telephone). As a further example, an option may be provided to redirect audio output to a specified device (e.g. a wireless headset, a remote speaker).

If it is determined at step 460 that the selection requires an option menu to be displayed, the option menu is displayed at step 462, and a selection of an option by the user is detected at step 464. Otherwise, the flow of method steps proceeds directly to step 470.

At step 470, the incoming call is processed according to the selection of the mobile device key by the user as detected at step 450, or the selection of an option from the options menu by the user as detected at step 464, depending on the determination made at step 460. For example, the incoming call may be answered or ignored at this step, in known manner. If the incoming call has been received while the user is engaged in a different call, the different call may be put on hold or dropped at this step for example, in known manner.

If the user engages in the incoming call by answering the call, the call will continue until it is terminated (e.g. by the user or by the caller) at step 480. A further call may be received at the mobile device while the user is already engaged in a call if, for example, the mobile device is configured to provide "call waiting" functionality as described in connection with FIG. 8 below. In this manner, a further iteration of method 400 may be performed before the previous iteration has terminated. In that case, the steps of a new instance of method 400 may be concurrently performed as shown by the dotted arrow in FIG. 5.

Figure 6:
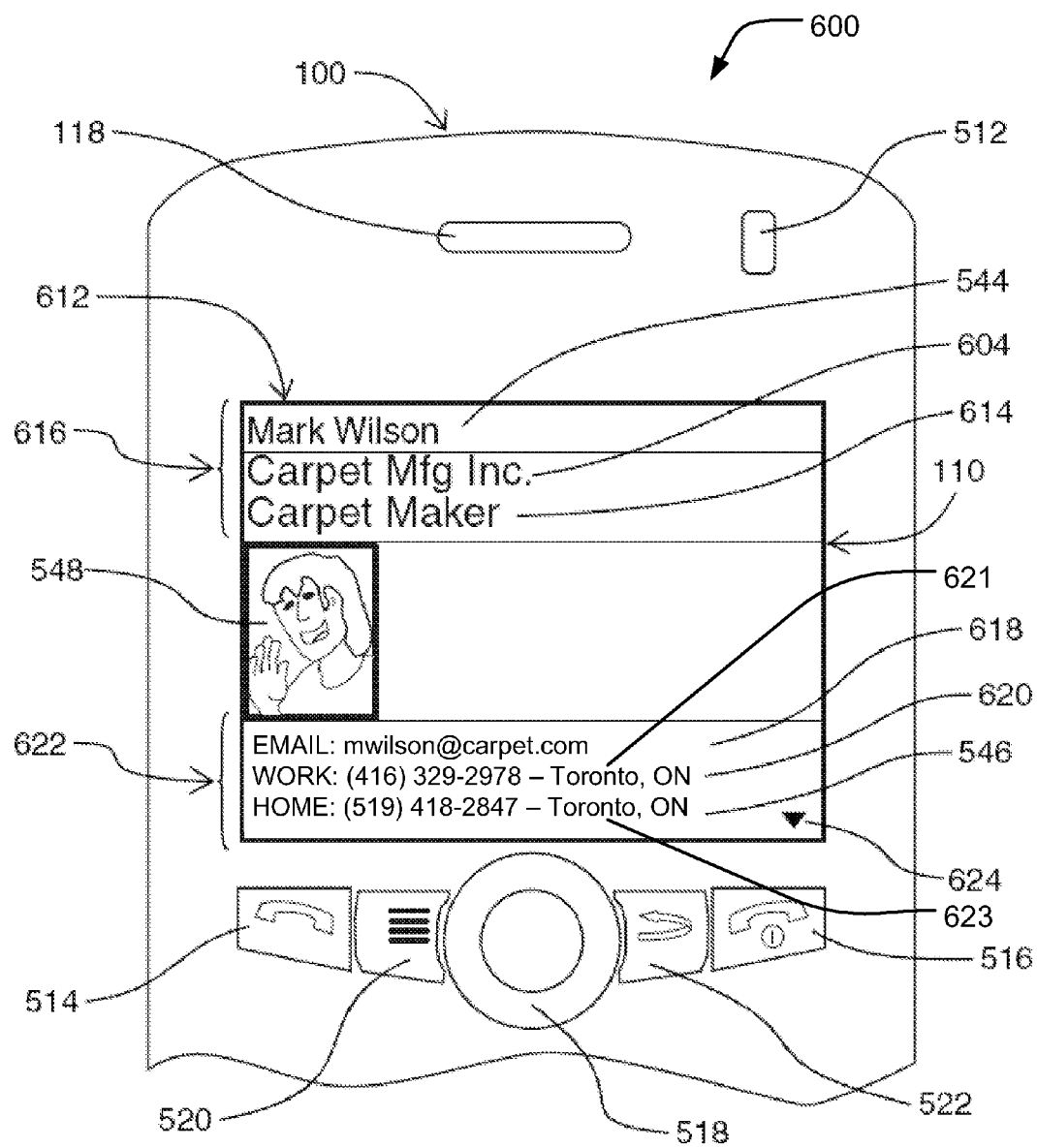
FIG. 6 is an example of a screenshot of a user interface that displays data used to populate the contact entry.

To further illustrate the foregoing features, reference is made to FIG. 6 which is an example of a screenshot 600 in display 110 of a user interface that displays a contact entry 612 in the address book 312 (shown in FIG. 4) of the mobile device 100. The screenshot 600 can also be used to populate contact entries 612 in the address book 312. Contact entry 612 comprises a contact name 544, a company name 604, and a title 614 within a primary contact details field 616. Contact entry 612 further comprises one or more pictures 548 associated with the contact. Contact entry 612 further comprises an e-mail address 618, and a second "Work" phone number 620 with an associated geographic location 621, in addition to "Home" phone number 546, within one or more contact details fields 622. Further phone numbers or other contact details may be provided within contact details field 622. The existence of additional contact details is indicated in this example by icon 624.

In the example embodiment of FIG. 6, the geographic location 621 "Toronto, ON" corresponds to the area code "416" of the "Work" phone number 620. The geographic location 621 is manually entered by the user when composing the contact entry 612 and can be set to show a geographic location that is different than the one corresponding to the area code associated with the phone number. For example, the "Toronto, ON" geographic location 623 does not correspond to the area code "519" for the "Home" phone number 546. Nonetheless, the user has intentionally opted for the "Home" number 546 to correspond to the "Toronto, ON" geographic location 623.

In another example embodiment, the geographic location 621 is automatically populated based on the area code when the contact entry 612 in the address book 312 is being populated. Accordingly, when composing contact entry 612, an application (e.g. the address book application 312) looks up the geographical location associated with the area code of the phone number, and automatically populates the geographic location in contact entry 612.

As previously noted, when a phone number for an incoming call is identified, it can be matched to a phone number in the contact details field 622 of contact entries stored on mobile device 100 to determine the associated contact entry (if one exists). Data from the associated contact entry can then be retrieved for display.

Figure 7:
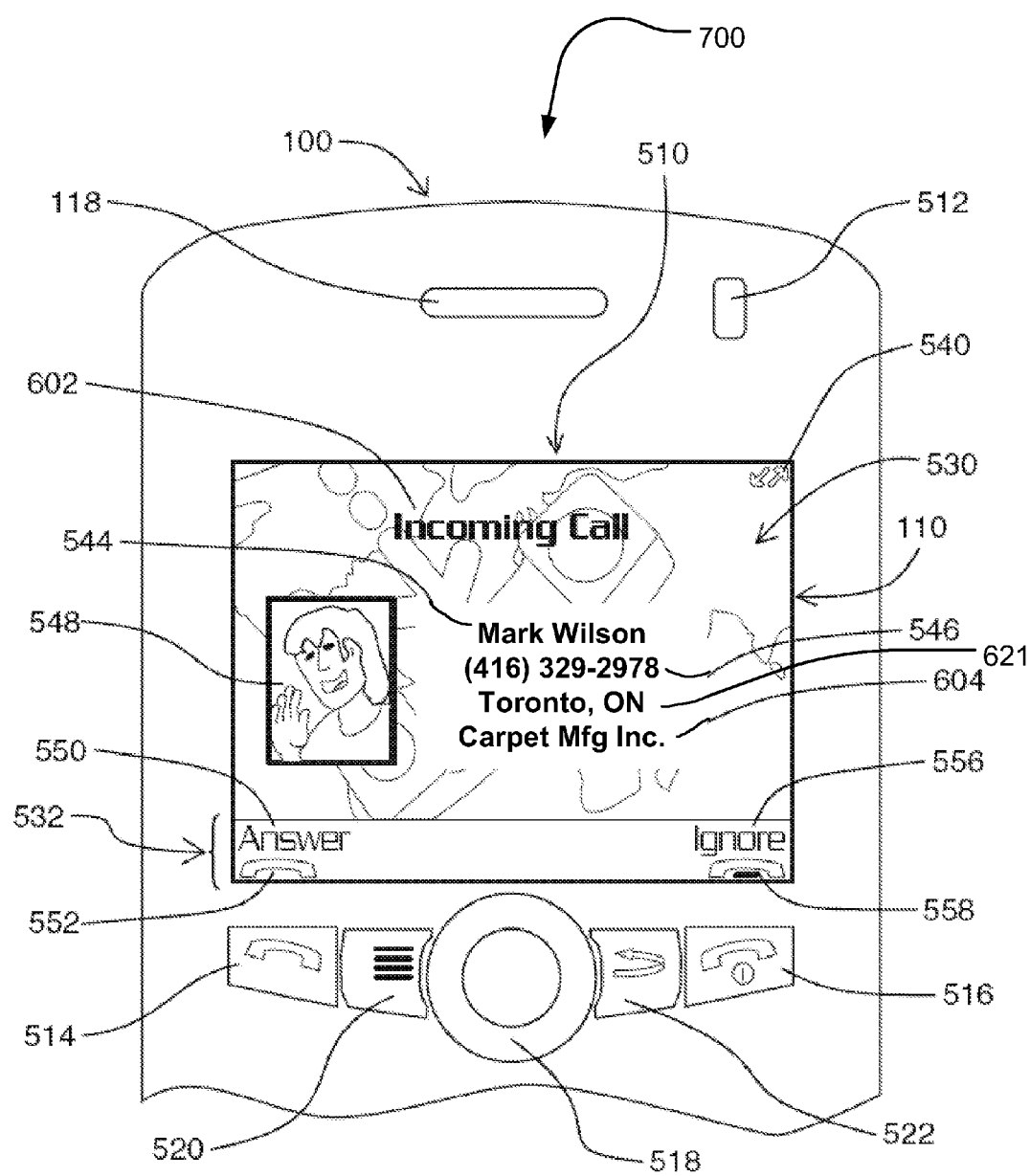
FIG. 7 is an example of a screenshot of a user interface provided to a user in accordance with an example implementation of an example embodiment.

Referring now to FIG. 7, a screenshot of a user interface provided to a user in accordance with an example implementation of one embodiment is shown generally as 700. In FIG. 7, screenshot 700 illustrates a user interface displayed in a display 110 of a mobile device 100, namely for an incoming call screen 510 used to inform the user of calls being received at mobile device 100. Mobile device 100 provides an integrated speaker 118, a visual alert indicator 512, a send key 514, an end key 516 (end key 516 is also used as a power-on key in this example implementation), a track ball 518, a menu key 520, and an escape key 522. While send key 514, end key 516, menu key 520 and escape key 522 are shown as physical keys provided on the mobile device 100 in this example, it will be understood by persons skilled in the art that some mobile devices may provide one or more of these keys as virtual keys on a touch-sensitive screen.

Incoming call screen 510 is divided into a caller identification data field 530 and a key label field 532. In this example, the combined areas of caller identification data field 530 and key label field 532 occupy the entire area of display 110. Moreover, the area of caller identification data field 530 is much greater than the area of key label field 532, allowing for greater flexibility in the layout of caller identification data (e.g. incoming call phone number and geographic location therefor) and potentially making displayed caller identification data easier to read. In this example, key label field 532 is illustrated as one contiguous field, although more than one separate key label field may be displayed on incoming call screen 510 in variant embodiments.

In the example embodiment of FIG. 7, the following items are displayed in caller identification data field 530. It is understood by those skilled in the art that not all of the following items are required to be displayed in the caller identification field 530:

a background image shown within caller identification data field 530;

a data transmission indicator 540 in the upper-right hand corner of display 110;

an "Incoming Call" indicator 602 centrally justified (horizontally) near the top of display 110, indicating that the incoming call is awaiting user consideration;

the name of the caller 544 associated with the current incoming call;

the phone number 546 associated with the current incoming call;

the geographic location associated with the incoming call;

the company name 604 associated with the incoming call; and a picture 548 associated with the caller, shown substantially centered (vertically) in the display 110.

Although not shown in FIG. 7, an identification of the caller's line (e.g. "Work", "Home") can also be determined for display in caller identification data field 530.

In this example, key label field 532 is confined to a narrow section of display 110, at an end of display 110 nearest the send key 514 and end key 516 provided by mobile device 100. A first label is displayed in an area on display 110 within key label field 532 close to and above send key 514. The first label comprises a text identifier "Answer" 550 and an answer icon 552. A second label is displayed in an area on display 110 within key label field 532 close to and above end key 516. The second label comprises a text identifier "Ignore" 556 and an ignore icon 558. Accordingly, the user can input a selection as to whether answer the call by pressing the send key 514, or to ignore the call by pressing the end key 516 so as to process the incoming call.

Figure 8:
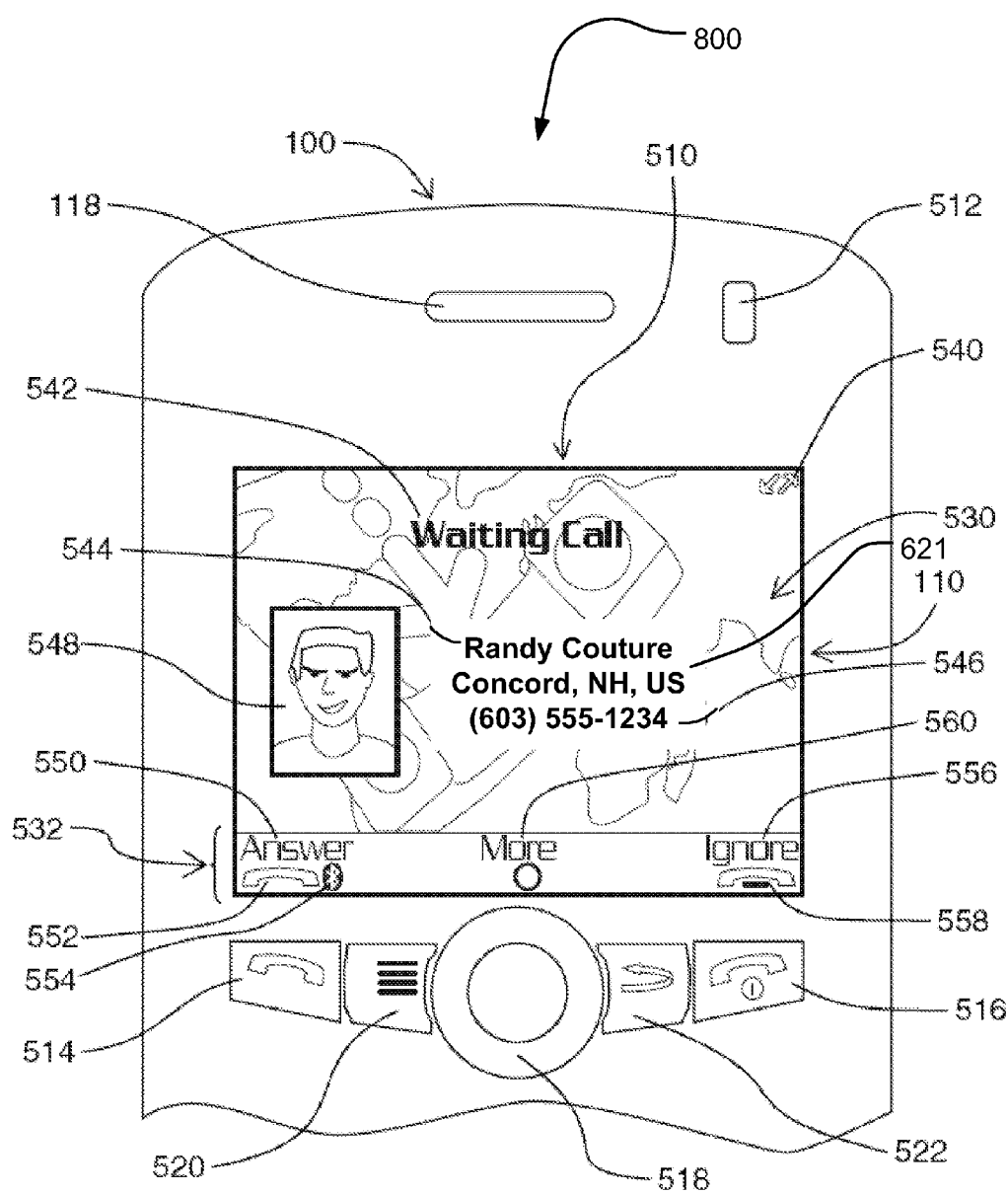
FIG. 8 is an example of a screenshot of a user interface provided to a user in accordance with an example implementation of another embodiment.

Referring now to FIG. 8, a screenshot of a user interface provided to a user in accordance with an example implementation of another embodiment is shown generally as 800.

Screenshot 800 illustrates a number of similar elements as shown in FIG. 7. Similar reference numerals are used to refer to similar elements, and reference may be made to the description in respect of screenshot 700 of FIG. 7 for further details on those elements that also appear in screenshot 700.

In FIG. 8, a "Waiting Call" indicator 542 is displayed, shown centrally justified (horizontally) near the top of display 110 in this example, indicating that a call is being received at mobile device 100 while the user is engaged in a different call. In this example, a Bluetooth™ headset has been activated for use, and accordingly, a wireless audio device icon (e.g. a Bluetooth™ symbol) 554 is also shown with the first label.

In this embodiment, options menu identifier 560 is presented to the user to allow the user to address the incoming call while the user is engaged in a previous call. The options menu identifier 560 is displayed within key label field 532 in an area close to and above track ball 518, and includes a white circle to suggest that the track ball 518 can be depressed to direct that an options menu be displayed. However, a direction to display to the options menu may be provided by depressing a different key (e.g. menu key 520) depending on the implementation. The options menu may also be displayed after a user depresses a key such as the menu key 520 even if an options menu identifier 560 has not been displayed within key label field 532. Moreover, it will also be understood that an options menu identifier 560 may be shown even if the user is not currently engaged in a different call.

In the example embodiment of FIG. 8, the name of the caller 544 and picture 548, phone number 546, and the geographic location 621 associated with the caller, are displayed in caller identification data field 530. After identifying phone number 546 when the call is received, a contact entry associated with the incoming call is determined by matching phone number 546 to a corresponding data item in a contact entry stored on the mobile device 100. Once the contact entry associated with the incoming call is determined, data items in the contact entry such as name of the caller 544, picture 548, geographic location 621, and/or company name 604 can be retrieved for display on the caller identification data field 530 of incoming call screen 510. Alternatively, the geographic location 621 can be resolved by comparing the area code of the incoming call with entries in a list, whereby each entry includes an area code and the associated geographic location. Once a match is found, the geographic location 621 corresponding to the area code of the incoming call is displayed in caller identification data field 530. As depicted in FIG. 1, such a list can reside in SIM 126 (such as list 109*a* shown in FIG. 1), in flash memory 108 (such as list 109*b* shown in FIG. 1), in RAM 106 (such as list 109*c* shown in FIG. 1), in database 201 (such as list 109*d* shown in FIG. 1) in communication with the wireless network 200, on a remote server, or elsewhere as understood by those skilled in the art.

In example embodiments wherein the list resides on the mobile device 100 (e.g. in SIM 126 (such as list 109*a* shown in FIG. 1), in flash memory 108 (such as list 109*b* shown in FIG. 1), or in RAM 106 (such as list 109*c* shown in FIG. 1)), the list can be stored or updated by a home network operator (e.g. a home public land mobile network or HPLMN in 3GPP parlance) when roaming either in the home country or abroad. Accordingly, the home network operator can store or update the list by sending the update information in a message, such as a Short Message Service (SMS) message, or by using an over-the-air (OTA) programming mechanism. In alternative embodiments, the mobile device 100 may be provisioned with information (such as an internet URL or other) that will enable it to retrieve list information (or updates thereof) without the home network operator having to send the information. This may be retrieved from a web site, database or other information store provided by the wireless network 200 or in certain circumstances by a third party.

In an example embodiment where the list 109*a* resides in SIM 126, the list 109*a* can be stored in an Elementary File on SIM 126 as proposed by the 3GPP Specification TS 31.102 file structure.

Figure 9:
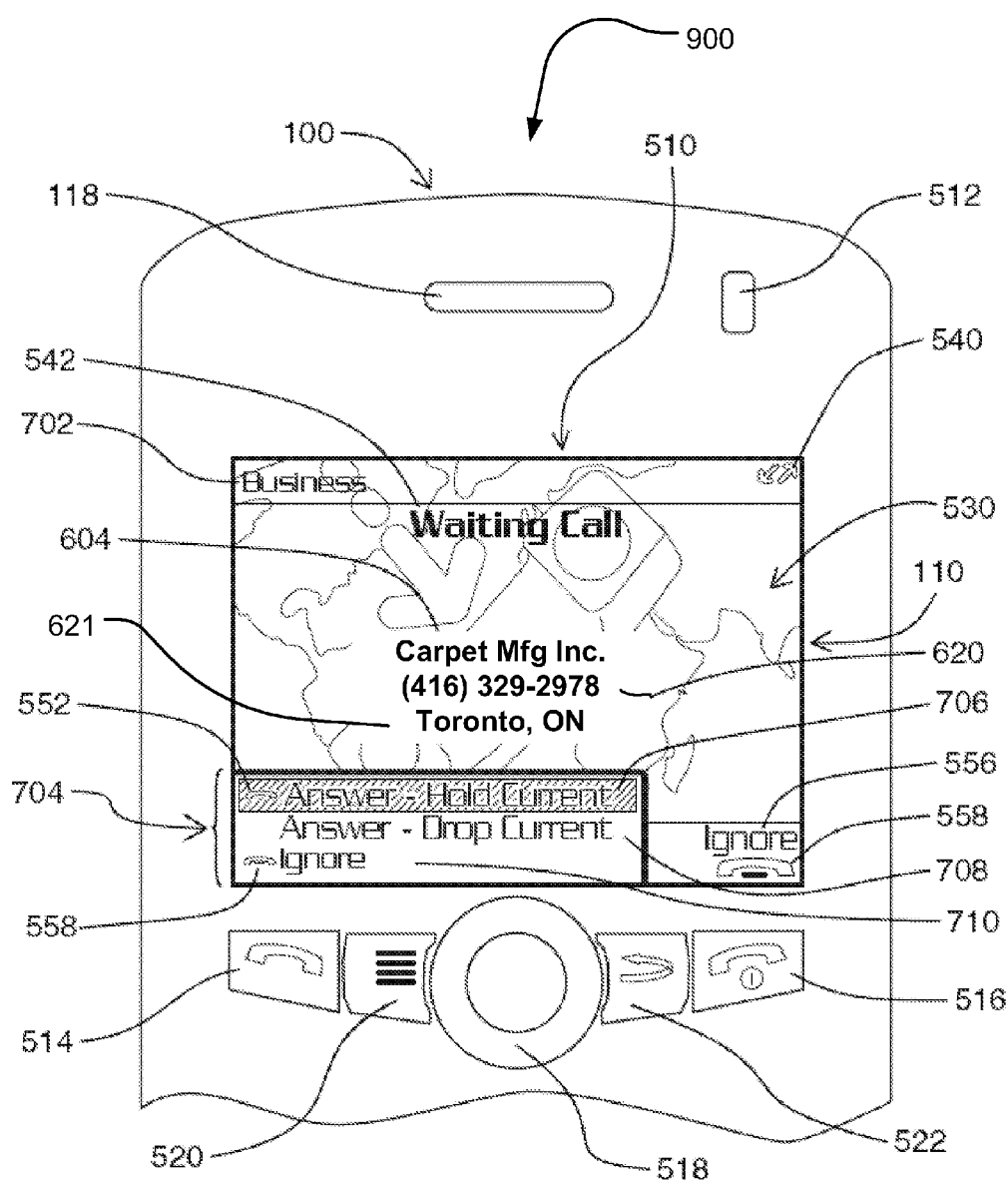
FIG. 9 is an example of a screenshot of a user interface provided to a user in accordance with an example implementation of another embodiment.

Referring now to FIG. 9, a screenshot of a user interface provided to a user in accordance with an example implementation of another embodiment is shown generally as 900. Screenshot 900 illustrates a number of similar elements as shown in FIGS. 7 and 8. Similar reference numerals are used to refer to similar elements, and reference may be made to the description in respect of the corresponding screenshots of FIGS. 7 and 8 for further details on those elements that also appear in screenshot 900.

In this example embodiment of FIG. 9, mobile device 100 provides access to multiple communication lines. Communication line identifier 702 is displayed to indicate that the incoming call is being received on the user's "Business" line. The "Waiting Call" indicator 542 also indicates that a call is being received while the user is already engaged in a different call.

When an incoming call is received on mobile device 100, the geographic location 621 associated with the calling party is displayed in caller identification data field 530. As noted above, the geographic location 621 may be determined based on the contact entry associated with the phone number of the incoming call, or can be determined by looking up the area code of the incoming call in a list of area codes and associated geographic locations to find a match. An options menu 704 is also displayed to allow the user with options for handling the incoming call in part based on the geographic location 621 associated with the incoming call. Options menu 704 may be displayed in response to the user pressing menu key 520 or track ball 518 for example, prompting the user for further direction on how to handle the incoming call and the other call that the user is engaged in. Through options menu 704, the user is provided with a first option 706 to answer the incoming call and hold the other call, a second option 708 to answer the incoming call and drop the other call, and a third option 710 to ignore the incoming call and continue with the other call. An answer icon 552 and ignore icon 558 can also be displayed in association with the options provided in options menu 704 to suggest that the user can also select the corresponding option 706 or 710 by pressing send key 514 or end key 516 respectively. Other options not shown in this example may be provided in options menu 704.

It will be understood by persons skilled in the art that the features of the user interfaces illustrated with reference to the example screenshots described herein are provided by way of example only. It will be understood by persons skilled in the art that variations are possible in variant implementations and embodiments.

It is noted that although some of the features of embodiments described herein may have been illustrated in combination in the examples of FIGS. 6 through 8 for ease of exposition, this is not to suggest that such features may only exist in such combinations. It will be understood by persons skilled in the art that certain features can be implemented independently of other features, and in different combinations in variant embodiments.

The steps of a method of providing a user interface for managing calls received at a mobile device in accordance with any of the embodiments described herein may be provided as executable software instructions stored on computer-readable media, which may include transmission-type media.

The disclosure has been described with regard to a number of embodiments. However, it will be understood by persons skilled in the art that other variants and modifications may be made without departing from the scope of the disclosure as defined in the claims appended hereto.

The invention claimed is:

1. A method of providing a user interface for managing incoming calls received at a mobile device, the mobile device providing access to at least a first communication line configured to receive incoming calls, the mobile device providing send and end keys, the method comprising the steps of:
identifying a phone number associated with the incoming call;
determining a geographic location associated with the incoming call; and
displaying an incoming call screen on a display of the mobile device, the incoming call screen comprising (i) a caller identification data field displaying data including the geographic location associated with the incoming call, the geographic location plotted on a map on the display and (ii) at least one key label field in which first and second labels for the send key and end key respectively are displayed;
wherein when the incoming call is received at the mobile device while the mobile device is receiving a different call, a third label is displayed in the at least one key label field at the displaying step, the third label comprising an options menu identifier.

2. The method of claim 1, further comprising the step of displaying an options menu on the incoming call screen.

3. The method of claim 1, further comprising the step of displaying an options menu on the incoming call screen only if a direction to display the options menu is received after the incoming call is first received at the mobile device.

4. The method of claim 1, further comprising the steps of: detecting when one of the send and end keys are selected, and processing the incoming call in accordance with the selected key.

5. The method of claim 1, further comprising the steps of: detecting when the direction to display the options menu is received, displaying the options menu, detecting when an option from the options menu is selected, and processing the incoming call in accordance with the selected option.

6. The method of claim 1, wherein at least one item of data associated with the incoming call is displayed in an area of the caller identification data field, the at least one item of data being the geographic location associated with the incoming call.

7. The method of claim 1, wherein the step of determining the geographic location associated with the incoming call further comprises:
determining a contact entry associated with the incoming call on the mobile device by matching the phone number associated with the incoming call to a data item in the contact entry, and displaying at least one item from the contact entry in the caller identification data field.

8. The method of claim 7, wherein the at least one item from the contact entry displayed in the caller identification data field comprises a geographic location associated with contact entry.

9. The method of claim 7, wherein the contact entry associated with the incoming call is stored in an address book on the mobile device.

10. The method of claim 1, wherein the step of determining the geographic location associated with the incoming call further comprises: comparing the area code of the incoming call with entries in a list including geographic area codes and associated geographic locations, and mapping the area code of the incoming call to corresponding geographic location in the list.

11. The method of claim 1, wherein the mobile device provides access to a plurality of communication lines configured to receive calls, and wherein data identifying the communication line on which the incoming call is received is displayed in the caller identification data field at the displaying step.

12. A computer-readable medium comprising instructions executable on a processor of the mobile device for implementing the method of claim 1.

13. A system for providing a user interface for managing calls received at a mobile device, the mobile device providing access to at least a first communication line configured to receive the calls, the mobile device providing send and end keys, the mobile device comprising a processor, a display, and at least one input device, wherein the system is configured to execute an application programmed to perform the steps of the method as claimed in claim 1.

14. A mobile device on which a user interface for managing calls received at the mobile device is provided, the mobile device providing access to at least a first communication line configured to receive the calls, the mobile device providing send and end keys, the mobile device comprising a processor, a display, and at least one input device, wherein the mobile device is configured to perform the steps of:
identifying a phone number associated with the incoming call;
determining the geographic location associated with the incoming call; and
displaying an incoming call screen on a display of the mobile device, the incoming call screen comprising (i) a caller identification data field displaying data including the geographic location associated with the incoming call, the geographic location plotted on a map on the display and (ii) at least one key label field in which first and second labels for the send key and end key respectively are displayed,
wherein when the incoming call is received at the mobile device while the mobile device is receiving a different call, a third label is displayed in the at least one key label field at the displaying step, the third label comprising an options menu identifier.

15. A mobile device as set forth in claim 14, wherein the mobile device is configured to determine the geographic location associated with the incoming call by comparing an area code of the incoming call with entries in a list including geographic area codes and associated geographic areas.

16. A mobile device as set forth in claim 15, wherein the list is stored or updated on the mobile device by a home network operator using an over-the-air programming mechanism.

17. A mobile device as set forth in claim 15, wherein the list is located in a Subscriber Identity Module (SIM) of the mobile device.

18. A mobile device as set forth in claim 15, wherein the list is located in a flash memory of the mobile device.

19. A mobile device as set forth in claim 15, wherein the list is located in a Random Access Memory (RAM) of the mobile device.

20. A mobile device as set forth in claim 15, wherein the list is located in a database in communication with a wireless network communicating with the mobile device.

* * * * *